United States Patent Office 3,500,029
Patented Mar. 10, 1970

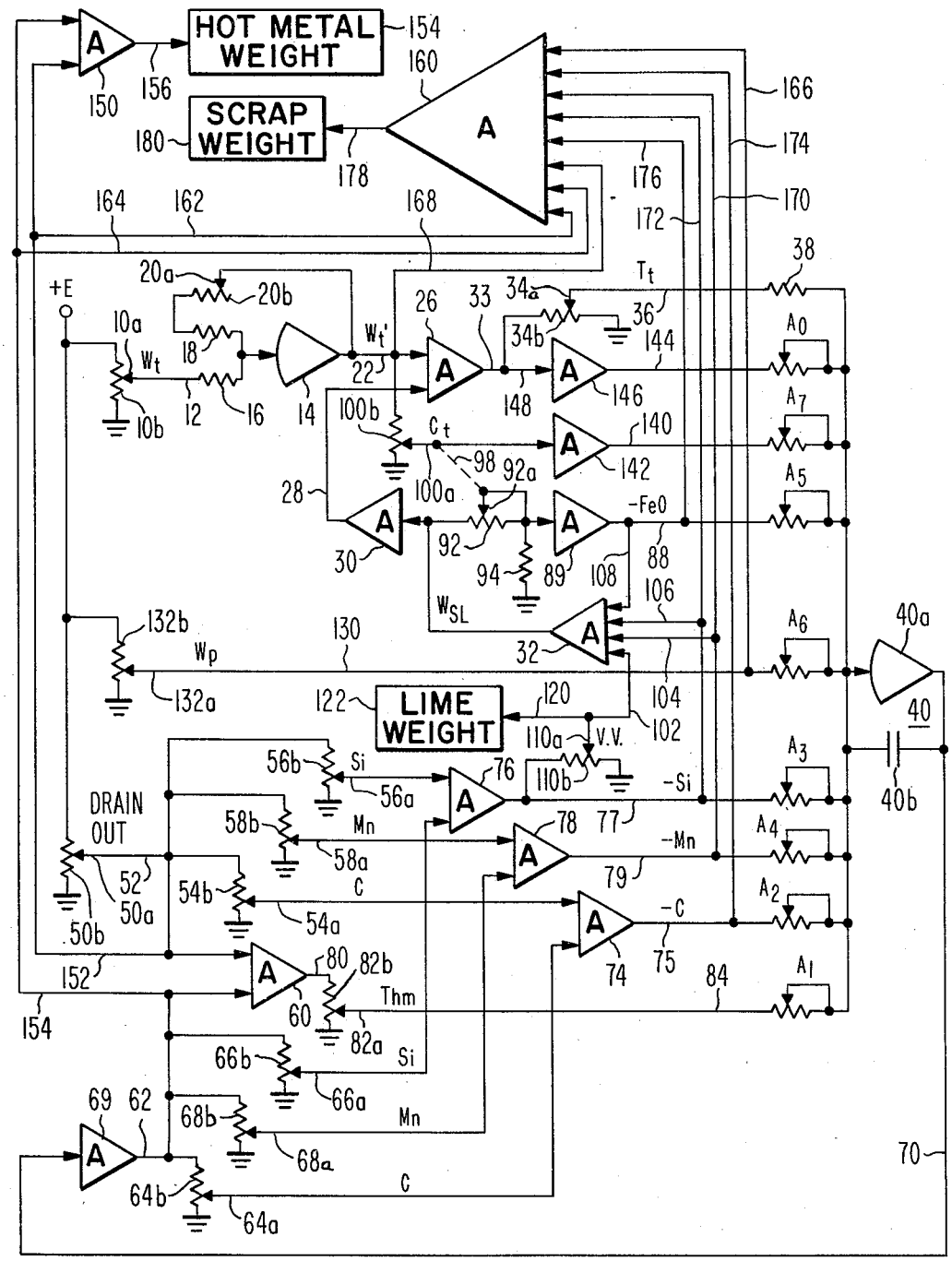

3,500,029
CHARGE COMPUTER FOR BASIC OXYGEN FURNACE
John W. Schwartzenberg, Maple Glen, Frank C. Luxl, Line Lexington, and Bernard Blum, Philadelphia, Pa., assignors to Leeds and Northrup Company, Philadelphia, Pa., a corporation of Pennsylvania
Filed Aug. 17, 1967, Ser. No. 661,423
Int. Cl. G06g 7/32
U.S. Cl. 235—184                                    10 Claims

ABSTRACT OF THE DISCLOSURE

An analog charge computer for computing the hot metal weight, scrap weight and lime weight for a charge in a basic oxygen furnace from set values for the tap temperature, tap carbon, pellet weight and initial carbon, silicon and manganese analysis of the hot metal. The hot metal weight signal is modified until the sum of the signal representing the heat supplied due to the temperature of the hot metal and the signals representing the heat supplied as the heat of reaction of each of the impurities is equal to the signal representing the computed value for the heat required to provide the set tap temperature. The scrap weight is obtained by subtracting from the sum of signals representing the tap weight and the weight of the impurities a signal equal to the sum of the sum of the signals representing the hot metal weight and the weight of the pellets. The lime weight is obtained from the product of the silicon weight and the basicity ratio.

BACKGROUND OF THE INVENTION

This invention relates to means for computing the weight of the materials to be charged in a basic oxygen furnace to produce a predetermined temperature and carbon concentration at tap. More specifically, the invention relates to an analog computing means into which is set the desired temperature and carbon concentration as well as other charge conditions such as the desired tap weight, the weight of the pellets to be added and the carbon, silicon and manganese analysis of the hot metal to be charged. The computer then computes the hot metal weight, scrap weight and lime weight required for the charge to obtain under normal blowing conditions the desired tap temperature when the proper tap carbon concentration has been reached.

Charge computations for establishing the amount of hot metal and scrap as well as the amount of lime to be charged, have in the past been made by computing means of both the analog and digital variety. The approach used in those computers was, however, more complicated and in many cases less flexible and less efficient than that used in the present invention.

SUMMARY OF THE INVENTION

In accordance with the present invention there is provided a means for determining the quantity of hot metal to be added to the charge of a basic oxygen furnace so that under normal blowing practice the heat will be at the desired temperature for tapping when the required refining has been completed. This means includes means for producing a signal representative of the heat which must be made available to the hot metal bath during the refining process to provide the desired tapping conditions. That signal is obtained from the product of a signal representing the set tap temperature and a quantity made up of the sum of a signal representing the tap weight desired for the steel being produced and the weight of the slag being simultaneously produced. Also, this means includes a means for producing a signal representative of the weight of the hot metal to becharged from different sources as required to obtain the complete charge and means responsive to the total hot metal weight for producing a signal representative of the product of the hot metal temperature and the total hot metal weight as well as means for modifying that signal in accordance with the heat content of the hot metal so as to provide a signal representing the heat added to the process by the hot metal charge. The computing means also includes means which are responsive to the signal representative of the hot metal weight for producing a plurality of separate signals each representing the total weight of one of the hot metal impurities which will combine with the oxygen during the blow to produce its heat of reaction as another source of added heat for the process. The measure of the heat added by the reaction of the impurities is obtained from the separate signals in accordance with their individual heats of reaction to obtain signals in terms of the heat added to the process. There is also included means responsive to the signal representative of the weight of the impurities which go into the slag for producing signals indicative of the weight of the slag formed on the charge as well as means responsive to the slag weight signal for producing a feedback signal indicative of the weight of FeO produced in the slag with the feedback signal being summed with the signals representing the weight of the impurities which go into the slag so as to modify the slag weight signal. Also, there is included means responsive to the difference between the signal representative of the heat required to obtain the desired tapping conditions and the sum of the separate signals representing the heat added to the process for modifying one of the signals representing the weight of hot metal from one of the sources of hot metal in direction and extent to balance the magnitude of the signals representing the heat required and the sum of the signals representing the heat added so that the sum of the modified signal representing the weight of the hot metal from one of the sources and the other signal representing the weight of the hot metal from the other sources is indicative of the total hot metal required to obtain the desired tap temperature after refining the charge under normal blowing conditions.

It is, therefore, an object of this invention to provide an improved charge calculator for a basic oxygen steel refining process.

Another object of this invention is the provision of means for calculating the desired weight of hot metal for a B.O.F. charge to provide the desired temperature and tap carbon.

Still another object of this invention is the provision of means for calculating the weight of scrap for a B.O.F. charge to produce the desired temperature and carbon concentration at tap.

Still another object of this invention is the provision of means for calculating the weight of lime for a B.O.F. charge to produce the desired basicity ratio in the charge.

BRIEF DESCRIPTION OF THE DRAWING

The drawing is a circuit in block diagram form showing the analog computer of the present invention in a preferred form.

DESCRIPTION OF THE PREFERRED EMBODIMENT

As is well known, the basic oxygen furnace, in contrast to the open hearth, is a thermally self-sufficient process in that no fuel need be added to the initial charge of the furnace in order to reach the desired final temperature. The final temperature will, of course, be a function of the charge composition as well as the operating conditions. It is desirable that the charge composition should be such that the normal blowing practice for the furnace will result in a final or tap temperature as close as possible to the desired value when the refining process carried out by the furnace has been completed by the reduction of the carbon concentration to its desired value. While methods and means have been developed for manipulating the operating conditions during the blow in order to vary both the tap temperature and the tap carbon concentration, it is nevertheless highly desirable to begin the heat with a thermally balanced charge so as to minimize the necessity for excessively manipulating the operating conditions and to therefore reduce the number of heats which are not within the prescribed limits as to temperature and carbon concentration without the addition of scrap or a reblowing operation or similar corrective measure.

To provide the optimum charge composition, the weight of hot metal, scrap and lime to be charged in the furnace can be computed by means of a heat balance computation based upon the setting of the desired tap temperature, tap carbon, tap weight, and pellet weight as well as the basicity ratio desired. Such a heat balance may be written in the form of an equation as follows:

$$W_t' cp_t T_t + W_{SL} cp_{SL} T_t = a_0 W_t' cp_t + a_0 W_{SL} cp_{SL}$$
$$+ a_1 W_{hm} cp_{hm} T_{hm} + a_2 W_{hm}\left(\frac{\%C}{100}\right) + a_3 W_{hm}\left(\frac{\%Si}{100}\right)$$
$$+ a_4 W_{hm}\left(\frac{\%Mn}{100}\right) + a_5 W_{FeO} - a_6 W_p - a_7 W_t'\left(\frac{\%C_t}{100}\right) \quad (1)$$

dividing through by the specific heat $Cp_t$ we get $$T_t(W_t' + BW_{SL}) = A_0(W_t' + BW_{SL}) + A_1 W_{hm} T_{hm}$$
$$+ A_2 W_{hm}\left(\frac{\%C}{100}\right) + A_3 W_{hm}\left(\frac{\%Si}{100}\right) + A_4 W_{hm}\left(\frac{\%Mn}{100}\right)$$
$$+ A_5 W_{FeO} - A_6 W_p - A_7 W_t'\left(\frac{\%C}{100}\right) \quad (2)$$

also we can write the following equations $$W_{SL} = W_{hm}\left[2.14\left(\frac{\%Si}{100}\right) + 1.29\left(\frac{\%Mn}{100}\right)\right] + W_L W_{FeO} \quad (3)$$

where $$W_{FeO} = \left(\frac{\%FeO}{100}\right) W_{SL}$$

and $$W_L = \left(\frac{60.06}{28.06}\right)\left(\frac{1}{r}\right)(v.v.)\left(\frac{\%Si}{100}\right) W_{hm} \quad (4)$$

$$W_{sc} = W_t' - W_{hm}\left[1 - \left(\frac{\%C}{100}\right) - \left(\frac{\%Si}{100}\right) - \left(\frac{\%M}{100}\right)\right]$$
$$+ \frac{56.85}{71.29} W_{FeO} - \frac{2}{3} W_p \quad (5)$$

where:

$T_t$ = tap temperature
$W_t$ = tap weight of the steel
$W_t'$ = tap weight of the steel compensated for losses = $W_t$ $(1+K_{Loss})$
$W_{SL}$ = slag weight $$B = \text{ratio of } \frac{cp_{SL}}{cp_t}$$

$W_{hm}$ = hot metal weight
$T_{hm}$ = hot metal temperature
%C, %Si, %Mn = hot metal carbon, silicon, and manganese percentage
$W_{FeO}$ = weight of FeO
$W_p$ = weight of pellets
$C_t$ = tap carbon
$W_{sc}$ = weight of scrap
$W_L$ = weight of lime
V.V. = basicity ratio
$r$ = fraction of CaO in lime
$cp_t$ = specific heat of steel
$cp_{hm}$ = specific heat of hot metal
$cp_{SL}$ = specific heat of slag
$a_n$ = heat of reaction of the $n$th element The block diagram of the figure is a circuit arrangement which may advantageously be utilized for the solution of Equation 2. In the use of the analog computer shown in the figure the operator would normally preset into the computer values representing the desired tap temperature, the desired tap carbon concentration, the desired tap weight, the desired basicity ratio, the desired weight of pellets to be added, and the weight of any hot metal to be charged from a source or sources other than that source which is utilized for the final adjustment of the total charge weight of hot metal. The hot metal weight from such a source is known as the "drain out" weight since it is usually the weight of the hot metal obtained from the draining out of a hot metal car used to supply a previous charge. The operator after having made the above settings, some of which may initially represent a rough estimate of a final value, will also set into the computer the carbon, silicon, and manganese concentrations of the "drain out" metal as well as the carbon, silicon, and manganese concentrations of the hot metal to be added to make up the total charge in addition to an estimated temperature for the hot metal charge. Having made these settings, the operator would normally charge the transfer ladle with approximately 90% of its expected hot metal charge and then make a temperature measurement of that charge to provide for a more accurate setting of the temperature setting in the computer. With this more accurate setting, the indicated total hot metal weight as read from the computer read-out will make evident the additional amount which will be required to provide 100% of the hot metal for the charge. At the same time the computer will indicate the total scrap weight necessary and the lime weight necessary.

As shown in the figure, the desired tap weight $W_t$ is set upon the computer by adjusting the contact 10a along the potentiometer slidewire 10b so as to produce on line 12 a signal representative of the desired weight of the refined steel at the time of tapping. As shown in the figure, the potentiometer slidewire 10b is connected at its upper end to a source of potential +E and at its bottom end to ground. The signal on line 12 provides one input to the high gain amplifier 14 through input resistor 16. The other input to amplifier 14 by way of input resistor 18 is through a feedback path which includes an adjustable potentiometer, whose slidewire 20b is shown as having a variable contact 20a, which can be adjusted in accordance with the fixed losses expected from the hot metal charge. There is thus produced on line 22 a signal which is representative of a compensated value $W_t'$ for the tap weight since the tap weight $W_t$ has been compensated for the exepcted losses.

The signal on line 22 is supplied as one of the inputs to amplifier 26. The other input to amplifier 26 by way of line 28 from sign changing amplifier 30 is from the output of amplifier 32 and is representative of the slag weight $W_{SL}$. Amplifier 26 serves to sum the signals on lines 22 and 28 and to provide an output from amplifier 26 on line 33 which supplies the potentiometer slidewire 34b so as to provide on its tap 34a a signal representative of the product of the sum of the compensated tap weight and slag weight by the tap temperature $T_t$ as represented by the setting of contact 34a. The resulting signal as obtained on tap 34a is supplied by way of line 36 through input resistor 38 of the integrating amplifier 40 so as to provide as one input to amplifier 40 a signal, namely, the current on line 36 representative of the heat required to be released in the bath of the furnace during the refining process to provide the tap temperature as set by the positioning of contact 34a with a tap weight as set by contact 10a.

Potentiometer slidewire 50b has its contact 50a adjusted in accordance with the "drain out" weight, that is, the weight of the hot metal drained from the torpedo car used for a previous charge so as to provide a comparable signal on line 52. The potentiometer slidewire 50b is supplied by potential +E, as shown in the drawing.

The signal on line 52 then provides a source for potentiometer slidewires 54b, 56b, and 58b which are each connected at their upper terminals to line 52 and grounded at their lower terminals. The associated contacts 54a, 56a, and 58a are respectively adjusted in accordance with the percent of carbon, silicon, and manganese obtained by analysis of the hot metal represented by the weight signal on line 54, that is, the "drain out" hot metal.

Line 52 is also connected as one input to amplifier 60. The other input to amplifier 60 which has another input derived from line 62 on which appears a signal representative of the hot metal weight to be charged from the source to be used to complete the furnace charge. The signal on line 62 is also connected to the upper end of the individual potentiometer slidewires 64b, 66b, and 68b whose individual slidewire contacts 64a, 66a, and 68a are adjusted in accordance with the respective carbon, silicon, and manganese concentrations obtained from the analysis of the hot metal from the source whose weight is represented by the signal on line 62. As will be evident from the figure, the signal on line 62 is derived from sign changing amplifier 69 which has an input from line 70 which is an output from integrating amplifier 40. Integrating amplifier 40 is shown as consisting of the high gain amplifier 40a and a capacitor 40b in the feedback circuit of amplifier 40a which provides a constant change of the signal on line 70 and hence the signal on line 62 until the inputs to amplifier 40 are balanced. As will be pointed out, the inputs to amplifier 40 consist of inputs which represent heat required in the furnace to provide the desired tapping conditions and other inputs which represents the heat produced or the heat added to the furnace by virtue of the various reactions taking place therein and by virtue of the temperature of the hot metal charge itself. The inputs to the amplifier 40 also take into the count heat losses to certain additives such as the pellets added to the charge.

The signal derived from the potentiometer slidewire taps 54a and 64a are added in amplifier 74 to produce a signal on line 75 representing the total weight of one of the hot metal impurities which will combine with the oxygen blown into the furnace to produce its heat of reaction as one of the added sources of heat for sustaining the refining action in the furnace. The particular signal obtained on line 75 represents, as indicated, the total weight of the carbon in the hot metal charged into the furnace. The signal on line 75 is modified by the adjustable resistor $A_2$ representing the constant factor $A_2$ of Equation 2 so as to provide an input, namely, the current through line 75 into amplifier 40 representative of the heat generated during the refining process by the reaction of carbon and oxygen.

Similarly, the signal from slidewire tap 56a is added to the signal from tap 66a in amplifier 76 so as to produce on line 77 a potential representative of the total weight of silicon in the hot metal charged in the furnace. The signal on line 77, representing the total weight of silicon, is modified by the adjustable slidewire $A_3$ which is connected between line 77 and the input to amplifier 40 so as to modify the signal representing the total silicon weight to produce a signal, namely, the current in line 77 representative of the heat generated by the combination of silicon with the oxygen blown into the furnace.

The potential at slidewire contact 58a is added to the potential of slidewire 68a by amplifier 78 so as to provide on line 79 a potential representative of the total weight of manganese in the hot metal charge. The signal represented by the potential on line 79 is modified by adjustable slidewire $A_4$ so that the current in line 79, which is an input to amplifier 40, is representative of the heat generated by the combination of manganese with the oxygen blown into the furnace. Thus, the currents in lines 75, 77, and 79 are separate signals representing heat added to the furnace because of the heat of reaction liberated by the combination of the impurities of the hot metal with the oxygen blown into the furnace. Those added quantities of heat help to maintain the refining reaction, as previously mentioned.

One of the prime sources of heat supplied to the furnace is supplied by virtue of the temperature of the hot metal charged into the furnace. In this connection, the amplifier 60 provides on line 80 a signal which is multiplied by the hot metal temperature $T_{hm}$ by means of the potentiometer slidewire 82b and its associated contact 82a. The contact 82a is connected as shown through variable resistor $A_1$ to provide in line 84 a current input to amplifier 40 representative of the heat supplied by virtue of the temperature of the hot metal charged.

Another source of added heat is that obtained from the reaction of the iron with the oxygen blown into the furnace to provide FeO in the slog. The signal representing the heat added by virtue of that reaction is represented by the current supplied on line 88 through variable resistor $A_5$. That signal is developed as an output from amplifier 89 which is in a feedback path for amplifier 32, the feedback path includes not only amplifier 89 but also a voltage divider comprised of a variable resistor 92 having a variable tap 92a and the resistor 94 connected from the input of 89 to ground. The feedback path around amplifier 32 serves to determine the portion of the total slag weight which consists of FeO. That proportion is determined by the positioning of contact 92a. That positioning is accomplished through the mechanical linkage 98 which moves in accordance with the set tap carbon concentration $C_t$ which is adjusted at top 100a on slidewire 100b. By so connecting the taps 92a and 100a there is established the desired non-linear inverse relationship between $C_t$ and the percentage of FeO in the slag which relationship has been empirically determined to be sufficiently accurate for the purpose of the computations made by the computer.

In order to obtain an output from amplifier 32 indicative of the total slag weight there is added by amplifier 32 the signals representing the weight of the impurities which go to make up the slag, namely, manganese and silicon as well as a signal representative of the lime weight which signal is supplied on line 102. Thus, the inputs to amplifier 32 constitute a signal on line 104 obtained from line 79 and a signal on line 106 obtained from line 77 as well as the signal on line 102 and the signal provided by the feedback circuit on line 108 which is connected to line 88 and is representative of the weight of FeO in the slag.

The signal on line 120 representing the lime weight is derived from potentiometer slidewire tap 110a of potentiometer slidewire 110b which has its upper end connected to line 77 and its lower end connected to ground. The tap 110a is adjusted in accordance with the v.v. ratio, that is, the basicity ratio. As shown in figure, the top 110 is connected by way of line 120 to an indicator 122 which will serve to provide an indication of the lime weight to be added to the charge to provide the set basicity ratio as established by the adjustment of tap 110a.

One of the inputs to amplifier 40, which represents a heat loss in the process, is the input provided as a current on line 130 through variable resistor $A_6$. This signal is derived from variable tap 132a of potentiometer slidewire 132b whose position is representative of the weight of the pellets to be added represented by the symbol $W_p$. As shown in the figure, the slidewire 132b has its upper end connected to a source +E and its lower end connected to ground.

All of the carbon in the hot metal bath is not combined with oxygen, as it is desired to have a certain percentage of carbon remaining in the metal when it is tapped. An input must be provided to amplifier 40 representative of that portion of the heat which is not obtained due to the residual carbon concentration $C_t$ as set by the adjustment of contact 100a. This signal is provided as a current on line 140 through the variable resistor $A_7$. The current on line 140 is a signal derived as an output of the sign changing amplifier 142 whose input is derived from tap 100a and is therefore representative of the product $W_t'C_t$.

For purposes of convenience, there is incorporated in the computer here described an input representing a constant which may be used as a correction on the effect of tap temperature. This input is provided on line 144 through variable resistor $A_0$ to amplifier 40. Line 144 is connected as an output from sign changing amplifier 146 whose input from line 148 is derived from line 33. This input becomes useful, for example, when regression anaylsis has been used to establish the desired constants for computation rather than the use of theoretical constants.

In order to obtain an indication of the total weight of hot metal to be charged into the furnace, amplifier 150 sums the signal derived from line 52 by way of line 152, representing the "drain out" hot metal weight, and the signal derived from line 62 by way of line 154 so as to obtain on output line 156 an input to indicator 154 indicative of the total required hot metal weight which will then be indicated by indicator 154.

In order to obtain an indication of the weight of scrap to be added to the charge it is necessary to sum the total hot metal weight and the weight of the pellets which are to be added and to subtract that sum from the sum of the compensated tap weight $W_t'$ and the total weight of the carbon, silicon, manganese, and FeO. This computation is accomplished by amplifier 160 which obtains signals from lines 162 and 164 which are connected in turn to lines 152 and 154 and therefore represent the "drain out" weight and the remaining hot metal weight. The input indicative of the weight of the pellets which are to be added is obtained by way of line 166 which is connected to line 130. Amplifier 160 thus adds the inputs to lines 162, 164, and 166 and from that sum it subtracts the input on line 168 representing the compensated tap weight $W_t'$, the input on line 170 which is connected to line 79 and represents the total weight of the manganese in the charge, the input on line 172 which is connected to line 77 and represents the total weight of the silicon charge and the signal on line 174 which is connected to line 75 and represents the weight of carbon in the charge as well as the signal on line 176 which is connected to line 88 and represents the weight of FeO in the slag. As shown in the figure, the amplifier 160 provides by ways of line 178 a signal supplied to indicator 180 to produce an indication of the scrap weight to be added to the charge to obtain the desired refining conditions.

Whenever the settings of the computer are tentative in nature, as when approximate values are used, those values may be later changed when accurate values are known and a recalculated hot metal weight can then be calculated based upon the accurate values. For example, if $T_{hm}$ is not known with accuracy, then an assumed value can be used to determine the hot metal to be charged. After the calculated weight of hot metal has been charged a more accurate measure of the value $T_{hm}$ may be available, and if set into the computer will result in a new value for the hot metal weight. The value $W_p$ for the weight of the pellets to be added could then be adjusted to bring back the calculated hot metal weight to the amount charged in the furnace. The modified weight or pellets would then be used for the heat.

What is claimed is:

1. An analog computer for determining the quantity of hot metal to be added to the charge of a basic oxygen furnace so that under normal blowing practice the heat will be at the desired temperature for tapping when the required refining has been completed comprising means for producing a first signal representative of the tap weight desired for the steel produced, means for producing a second signal representative of the weight of the slag to be produced during the heat, means for producing a third signal representative of the tap temperature set for the heat, means for forming as a fourth signal a product signal in response to the product of said third signal and the sum of said first and second signals, means for modifying said fourth signal to produce a fifth signal representative of the heat required to be made available in the hot metal bath during the refining process to provide the desired tapping conditions, means for producing separate signals each representative of that part of the hot metal weight to be charged from the different sources of hot metal as required to complete the charge, means responsive to said separate hot metal weight signals for producing a signal representative of the product of the hot metal temperature and the total hot metal weight, means for modifying said last named signal in accordance with the heat content of the hot metal to provide a signal representing the heat added to the process by the heat content of the hot metal as charged, mans responsive to said hot metal weight signals for producing a plurality of separate signals each representing the weight of one of the hot metal impurities which combines with the oxygen blown into the furnace to produce its heat of reaction for sustaining the refining action, means for modifying each of said plurality of separate impurity signals in accordance with factors related to the heats of reaction of each of said impurities so that said modified signals each represent the heat generated in the refining process by the reaction of said impurities with the oxygen blown into the furnace, means responsive to the weight signals for those of said impurities which go into the slag for producing said second signal so that its magnitude is indicative of the weight of slag formed on the charge, means responsive to said second signal for producing a feedback signal indicative of the weight of FeO produced in said slag, said feedback signal being summed by said last named means with the weight signals for the slag producing impurities to modify said second signal, means responsive to the difference between said fifth signal and the sum of said separate signals representing the heat added to the process by reaction of the impurities with oxygen and by the hot metal for modifying one of said hot metal weight signals in direction and extent to balance the magnitude of said fifth signal and said sum.

2. An analog computer as set forth in claim 1 in which said means for modifying said one of said hot metal weight signals is an integrating amplifier which receives as inputs said fifth signal and said separate impurity signals representing the heat added to the process by the reaction of the impurities with oxygen and which produces as an output a signal which varies in sense and magnitude until said fifth signal equals the sum of said separate signals representing the heat added.

3. An analog computer as set forth in claim 1 in which said separate impurity signals representing the weight of each of the hot metal impurities includes a sixth signal representative of the weight of carbon in the hot metal, a seventh signal representative of the weight of silicon in the hot metal, and an eighth signal representative of the weight of manganese in the hot metal.

4. An analog computer as set forth in claim 3 in which said means for producing a second signal includes means for summing said seventh signal, said eighth signal, said feedback signal and a signal representative of the weight of lime added to the process, said lime weight signal being derived as a fraction of said seventh signal with said fraction representing the basicity ratio desired for the charge.

5. An analog computer as set forth in claim 4 in which said feedback signal indicative of the weight of FeO is modified by a factor related to the heat of reaction of FeO to produce a ninth signal representing the heat generated in the production of FeO during the refining process and means for adding said last named signal as another separate signal forming an input to said difference responsive means so that it is included as part of said sum of said separate signals representing the heat added.

6. An analog computer as set forth in claim 5 which includes means for producing in response to said first signal a signal representative of the weight of carbon to be tapped from the furnace, said last named signal being produced in response to said first signal and another signal having a magnitude of predetermined value representative of the fractional part of the charge at tap made up of carbon, and means for modifying said carbon weight signal by a factor related to the heat of reaction of carbon with oxygen to produce a tenth signal representative of the magnitude by which said sixth signal must be diminished to compensate for the amount of carbon remaining in the charge at tap, said tenth signal being introduced as an input to said difference responsive means with a polarity such that it diminishes the sum of the signals representing the heat added.

7. An analog computer as set forth in claim 6 in which said means responsive to said second signal for producing a feedback signal indicative of the weight of FeO includes a means for modifying said second signal to produce said feedback signal which means is varied in accordance with variations in the modification of said first signal in accordance with the percentage of remaining carbon desired in the charge at tap.

8. An analog computer as set forth in claim 7 which includes means for producing a signal representative of the weight of pellets to be added to the charge and means responsive to said pellet weight signal and a factor related to the specific heat of the pellet material to produce a twelfth signal representing the heat absorbed by the pellets during the refining process and means for adding said twelfth signal as another of said separate signals connected as an input to said difference responsive means in sense to subtract from the sum of the separate signals representing the heat added.

9. An analog computer as set forth in claim 8 which includes means operable to sum said first signal, said sixth, seventh, and eighth signals, and said feedback signal and for subtracting from said sum a signal representing a total of the hot metal weight to be charged and said twelfth signal to produce a signal indicative of the scrap weight required for the charge to provide at the end of the refining process the desired tapping conditions.

10. An analog computer as set forth in claim 9 in which said first signal is modified by a signal representing hot metal losses from the process during refining.

References Cited

UNITED STATES PATENTS

| | | | |
|---|---|---|---|
| 3,100,699 | 8/1963 | Bogdandy et al. | 75—59 |
| 3,181,343 | 5/1965 | Fillon | 75—60 X |
| 3,218,158 | 11/1965 | Dumont-Fillon | 75—60 |
| 3,329,495 | 7/1967 | Takayoshi et al. | 75—60 |
| 3,346,250 | 10/1967 | Strassburger | 266—30 |
| 3,409,764 | 11/1968 | Shinichiro et al. | 235—193 |

MALCOLM A. MORRISON, Primary Examiner

F. D. GRUBER, Assistant Examiner

U.S. Cl. X.R.

75—60; 235—193, 151.1, 151.33; 266—34

UNITED STATES PATENT OFFICE
CERTIFICATE OF CORRECTION

Patent No. 3,500,029　　　　　　　　　　　　　　　March 10, 1970

John W. Schwartzenberg et al.

It is certified that error appears in the above identified patent and that said Letters Patent are hereby corrected as shown below:

Column 1, line 27, cancel "sum of the". Column 2, line 8, "becharged" should read -- be charged --. Column 3, equation (3), "+$W_L$ $W_{FeO}$" should read -- + $W_L$ + $W_{FeO}$ --. Column 4, line 61, "upon" should read -- into --. Column 5, line 2, "exepcted" should -- expected --. Column 6, line 43, "slog" should read -- slag --; line 57, "top" should read -- tap --; line 62, "purpose" should read -- purposes --. Column 7, line 7, "top" should read -- tap --; line 75, "ways" should read -- way --. Column 8, line 52, "mans" should read -- means --.

Signed and sealed this 15th day of December 1970.

(SEAL)
Attest:

Edward M. Fletcher, Jr.　　　　　　　　　　　WILLIAM E. SCHUYLER, JR.
Attesting Officer　　　　　　　　　　　　　　　Commissioner of Patents